US012561564B2

(12) United States Patent
Lapointe et al.

(10) Patent No.: US 12,561,564 B2
(45) Date of Patent: Feb. 24, 2026

(54) CLASSIFYING ELEMENTS IN AN INFRASTRUCTURE MODEL USING CONVOLUTIONAL GRAPH NEURAL NETWORKS

(71) Applicant: Bentley Systems, Incorporated, Exton, PA (US)

(72) Inventors: Marc-André Lapointe, Quebec City (CA); Louis-Philippe Asselin, Quebec City (CA); Karl-Alexandre Jahjah, Quebec City (CA); Evan Rausch-Larouche, Quebec City (CA)

(73) Assignee: Bentley Systems, Incorporated, Exton, PA (US)

( * ) Notice: Subject to any disclaimer, the term of this patent is extended or adjusted under 35 U.S.C. 154(b) by 659 days.

(21) Appl. No.: 17/963,824

(22) Filed: Oct. 11, 2022

(65) Prior Publication Data

US 2024/0127046 A1     Apr. 18, 2024

(51) Int. Cl.
| | |
|---|---|
| *G06N 3/08* | (2023.01) |
| *G06F 16/90* | (2019.01) |
| *G06F 16/901* | (2019.01) |
| *G06F 18/23* | (2023.01) |
| *G06F 18/2323* | (2023.01) |
| *G06N 3/04* | (2023.01) |

(52) U.S. Cl.
CPC ........... *G06N 3/08* (2013.01); *G06F 16/9024* (2019.01); *G06F 18/2323* (2023.01); *G06N 3/04* (2013.01)

(58) Field of Classification Search
CPC ........... G06N 3/08; G06N 3/04; G06N 3/048; G06N 3/0464; G06N 3/09; G06N 5/022; G06N 3/042; G06F 16/9024; G06F 18/2323; G06F 30/13; G06F 30/27
See application file for complete search history.

(56) References Cited

U.S. PATENT DOCUMENTS

| | | | | |
|---|---|---|---|---|
| 2021/0051169 A1* | 2/2021 | Karame | ................. | G06N 3/098 |
| 2021/0117716 A1 | 4/2021 | Lapointe et al. | | |
| 2021/0240730 A1* | 8/2021 | Polisetty | ............... | G06F 16/273 |
| 2022/0121886 A1* | 4/2022 | Jahjah | .................... | G06V 20/64 |

(Continued)

OTHER PUBLICATIONS

Agarwal, Aniket, et al., "Visual Relationship Detection Using Scene Graphs: A Survey", arXiv, arXiv:2005.08045v1 [Cs.CV], May 16, 2020, pp. 1-30.

(Continued)

*Primary Examiner* — Masud K Khan

(74) *Attorney, Agent, or Firm* — Cesari and McKenna, LLP; James A. Blanchette

(57) ABSTRACT

In example embodiments, techniques are provided for classifying elements of infrastructure models using a convolutional graph neural network (GNN). Graph-structured data structures are generated from infrastructure models, in which nodes represent elements and edges represent contextual relationships among elements (e.g., based on proximity, functionality, parent-child relationships, etc.). During training, the GNN learns embeddings from the nodes and edges of the graph-structured data structures, the embeddings capturing contextual clues that distinguish between elements that may share similar geometry (e.g., cross section, volume, surface area, etc.), yet serve different purposes.

18 Claims, 8 Drawing Sheets

CLIENT SIDE SOFTWARE 110

CLIENTS 120

CLOUD-BASED SOFTWARE 112

INFRASTRUCTURE MODELING HUB SERVICES 130

REPOSITORY 140

DESIGN VALIDATION SERVICE 132

GRAPH-STRUCTURED DATA GENERATION PROCESS — 134

GRAPH-STRUCTURED DATA STRUCTURE — 136

GNN — 138

(56) References Cited

U.S. PATENT DOCUMENTS

2022/0198813 A1 * 6/2022 Chiu ..................... G06V 10/82

OTHER PUBLICATIONS

Collins, Fiona, "Encoding of Geometric Shapes from Building Information Modeling (BIM) Using Graph Neural Networks," Master Thesis, ETH Zürich, ETH-Nr. 13-816-046, Sep. 11, 2020, pp. 1-91.

Jin, Chaoyi, et al., "Exploring BIM Data by Graph-based Unsupervised Learning," Scitepress, Science Technology Publications, Lda., In Proceedings of the 7th International Conference on Pattern Recognition Applications and Methods (ICPRAM 2018), Jan. 2018, pp. 582-589.

Li, Shuohao, et al., "Attentive Gated Graph Neural Network for Image Scene Graph Generation," MDPI, Symmetry, vol. 12, No. 511, Apr. 2, 2020, pp. 1-13.

Rosinol, Antoni, et al., "3D Dynamic Scene Graphs: Actionable Spatial Perception with Places, Objects, and Humans", arXiv, arXiv:2002.06289v2 [cs.RO], Jun. 16, 2020, pp. 1-11.

U.S. Appl. No. 17/314,735, filed May 7, 2021 by Louis-Philippe Asselin, et al. for Classifying Elements and Predicting Properties in an Infrastructure Model Through Prototype Networks and Weakly Supervised Learning, pp. 1-40.

"Notification of Transmittal of the International Search Report and the Written Opinion of the International Searching Authority, or the Declaration," International Filing Date: Oct. 2, 2023, International Application No. PCT/US2023/034293, Date of Mailing: Jan. 29, 2024, pp. 1-15.

Wang, Zijian, et al., "Exploring Graph Neural Networks for Semantic Enrichment: Room Type Classification," Elsevier B.V., Elsevier, Automation in Construction, vol. 134, Dec. 1, 2021, pp. 1-16.

* cited by examiner

500

ACCESS LABELED DATASET — 510

GENERATE GRAPH-STRUCTURED DATA STRUCTURE — 520

SPLIT LABELED DATASET INTO TRAINING AND VALIDATION DATASETS — 530

TRAIN CONVOLUTIONAL GNN — 540

SAVE TRAINED CONVOLUTIONAL GNN — 550

600

ACCESS PREDICTION DATASET          610

GENERATE GRAPH-STRUCTURED DATA STRUCTURE          620

APPLY CONVOLUTIONAL GNN TO
PRODUCE CLASS PREDICTIONS          630

OUTPUT CLASS PREDICTIONS          640

CLASSIFYING ELEMENTS IN AN INFRASTRUCTURE MODEL USING CONVOLUTIONAL GRAPH NEURAL NETWORKS

BACKGROUND

Technical Field

The present disclosure relates generally to infrastructure modeling, and more specifically to improved techniques for classifying elements of an infrastructure model.

Background Information

In the design, construction and/or operation of infrastructure (e.g., buildings, factories, roads, railways, bridges, electrical and communication networks, equipment, etc.) it is often desirable to create infrastructure models. An infrastructure model may maintain a built infrastructure model (BIM) or digital twin of infrastructure. A BIM is a digital representation of infrastructure as it should be built, providing a mechanism for visualization and collaboration. A digital twin is a digital representation of infrastructure as it is actually built, and is often synchronized with information representing current status, working conditions, position or other qualities.

It is often necessary to classify elements of an infrastructure model (e.g. maintaining a BIM or digital twin) as belonging to a particular class (e.g., a particular category, user label, ECClass, etc.) in order to execute analytical tools on the model, for example, analytical tools that measure and provide dashboards for monitoring project performance (e.g., schedule, cost, and safety compliance) and the impact of design changes. The class of an element may indicate the element is part of a group of similar elements. For example, a class may indicate an element should be grouped with other beams, walls, columns, braces, windows, doors, pipes, etc. In general, classes allow similar elements to be analyzed together. Without the ability to accurately classify elements into classes, running analytics is extremely difficult.

Infrastructure models (e.g., maintaining BIMs or digital twins) may be constructed by federating data from distributed sources. These data sources may include different amounts of class information that utilize various different types of nomenclature. It is often impractical to establish at the source standards that ensure certain amounts of class information are present always and that the nomenclature used is always coherent. Even if standards are established, if they are not rigorously monitored, an organization or vendor may introduce a non-compliant data source. Further, even if there is diligent standards enforcement, sometimes errors will still occur in the data. For example, due to human error an element may be misclassified.

Accordingly, it is often necessary to classify elements once the elements are federated into an infrastructure model, to correct misclassifications and fill in missing information. This may be done in a number of different ways. Some techniques are largely manual. For example, users may manually add or update class information. However, infrastructure models may include huge numbers of elements. In addition to being extremely time consuming, manual classification may be error prone.

Some automated techniques have been attempted to address the issues of manual classification. For example, machine learning techniques have been attempted. In one such technique, a classification model is trained to classify an element based on features inherent to the element, including geometric features (e.g., shape, volume, surface area, etc.). Once shown a sufficient number of labeled examples, the classification model may be able to predict the classification for another element. However, while such a classification model is useful in some contexts, it has a number of shortcomings. One prominent shortcoming is that it may fail to correctly classify elements where proper classification is dependent on its context. Some elements may have similar shape, volume, surface area and other geometric features yet serve different purposes depending on context. For example, a beam and a column may each be similarly shaped, with similar cross section, volume, surface area, etc., however differ in that one is being used in the context of a floor and one is used in the context of a wall. A traditional classification model that focuses primarily on features inherent to the element itself may fail to distinguish these types of elements, reaching a same class prediction for each, where they actually should be different.

Accordingly, there is a need for improved techniques for classifying elements of infrastructure models that may better consider contextual information and yield more accurate class predictions.

SUMMARY

In example embodiments, techniques are provided for classifying elements of infrastructure models using a convolutional graph neural network (GNN). Graph-structured data structures are generated from infrastructure models, in which nodes represent elements and edges represent contextual relationships among elements (e.g., based on proximity, functionality, parent-child relationships, etc.). During training, the GNN learns embeddings from the nodes and edges of the graph-structured data structures, the embeddings capturing contextual clues that distinguish between elements that may share similar geometry (e.g., cross section, volume, surface area, etc.), yet serve different purposes. As such, during prediction, the GNN may be better able to predict classifications than techniques that rely only on features inherent to individual elements.

In one example embodiment, a design validation service classifies elements in an infrastructure model using a convolutional GNN by accessing an inference dataset that includes an infrastructure model, generating a graph-structured data structure from the inference dataset that includes nodes that represent elements of the infrastructure model and edges that represent contextual relationships among the elements, applying the graph-structured data structure to the convolutional GNN to produce one or more class predictions for each element, wherein the convolutional GNN produces the class predictions using embeddings that have been learned using recursive neighborhood diffusion, and outputting indications of at least some of the produced class predictions, the outputting including displaying class predictions on a display screen, storing class predictions in the infrastructure model, or storing class predictions in a separate data file.

It should be understood that a variety of additional features and alternative embodiments may be implemented other than those discussed in this Summary. This Summary is intended simply as a brief introduction to the reader, and does not indicate or imply that the examples mentioned herein cover all aspects of the disclosure, or are necessary or essential aspects of the disclosure.

BRIEF DESCRIPTION OF THE DRAWINGS

The description below refers to the accompanying drawings of example embodiments, of which.

DETAILED DESCRIPTION

Figure 1:
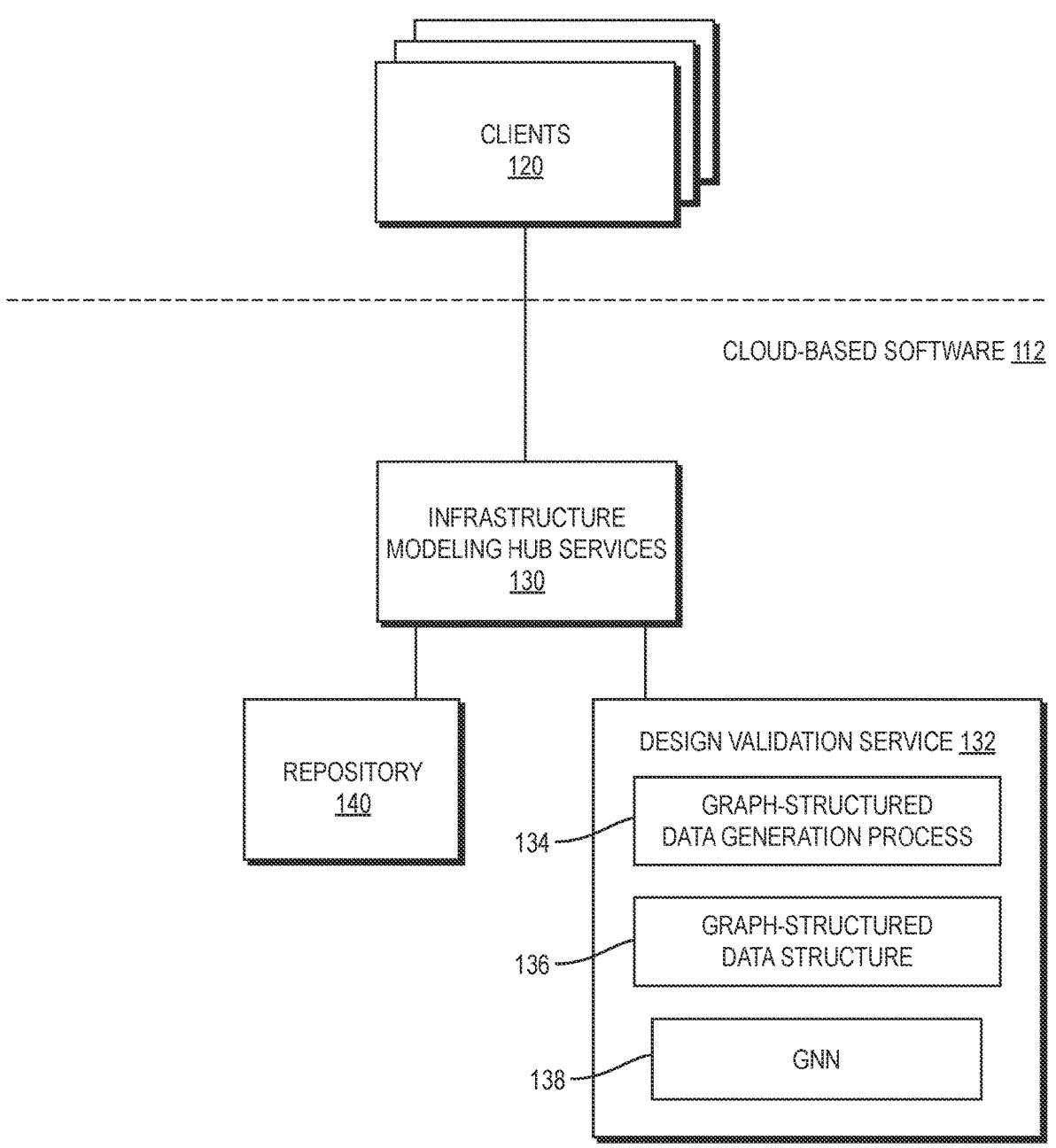
FIG. 1 is a high-level block diagram of at least a portion of an example software architecture that may implement the techniques described herein.

FIG. 1 is a high-level block diagram of at least a portion of an example software architecture that may implement the techniques described herein. The architecture may be divided into client-side software 110 executing on one or more computing devices arranged locally (collectively "client devices"), and cloud-based services software 112 executing on one or more remote computing devices ("cloud computing devices") accessible over the Internet. Each computing device may include processors, memory/storage, a display screen, and other hardware (not shown) for executing software, storing data and/or displaying information. The client-side software 110 may include client software applications (or simply "clients") 120 operated by users. The clients 120 may be of various types, including desktop clients that operate directly under an operating system of a client device and web-based client applications that operate within a web browser. The clients 120 may be concerned mainly with providing user interfaces that allow users to create, modify, display and/or otherwise interact with infrastructure models. As used herein, the term "infrastructure model" refers to a structure that maintains a digital twin, built infrastructure model (BIM) or other representation of infrastructure. One specific type of infrastructure model may be an iModel® infrastructure model. As used herein, the term "infrastructure" refers to a physical structure or object that has been built, or is planned to be built, in the real-world. Examples of infrastructure include buildings, factories, roads, railways, bridges, electrical and communication networks, equipment, etc.

The cloud-based software 112 may include infrastructure modeling hub services (e.g., iModelHub™ services) 130 and other services software that manage repositories 140 that maintain the infrastructure models. The clients 120 and the infrastructure modeling hub services 130 may utilize a built infrastructure schema (BIS) that describes infrastructure models, using elements. As used herein, the term "element" refers to a record that represents an individual unit of infrastructure. Elements are often hierarchically arranged according to parent-child relationships (e.g., a parent element may include one or more child elements). The BIS may utilize (be layered upon) an underlying database system (e.g., SQLite) that handles primitive database operations, such as inserts, updates and deletes of rows of tables of underlying distributed databases (e.g., SQL databases). The database system may utilize an underlying database schema (e.g., a DgnDb schema) that describes the actual rows and columns of the tables. Elements may be maintained using rows of tables, which store their geometry and any existing textual metadata, for example, properties, category, user label, ECClass, etc.

The infrastructure modeling hub services (e.g., iModelHub™ services) 130 may interact with a number of other services in the cloud that perform information management and support functions. One such service may be a design validation service 132 that evaluates the impact of design changes on performance of an infrastructure model, including project schedule, cost, and safety compliance. The design validation service 132 may be capable of automatically classifying elements of an infrastructure model by predicting their classes (e.g., category, user label, ECClass etc.), to correct misclassification or to fill in missing information, among other purposes. To do this, the design validation service 132 may include a graph-structured data generation process 134 that generates a graph-structured data structure 136 in which nodes represent elements and edges represent contextual relationships among elements (e.g., based on proximity, functionality, parent-child relationships, etc.), and a convolutional GNN 138 that learns embeddings from the nodes and edges of the graph-structured data structure 136. The use of a graph data structure 136 and convolutional GNN 138 may permit more complete learning of contextual information, allowing the design validation service 132 to better distinguish between elements that may share similar geometry (e.g., cross section, volume, surface area, etc.), yet serve different purposes.

Figure 2:
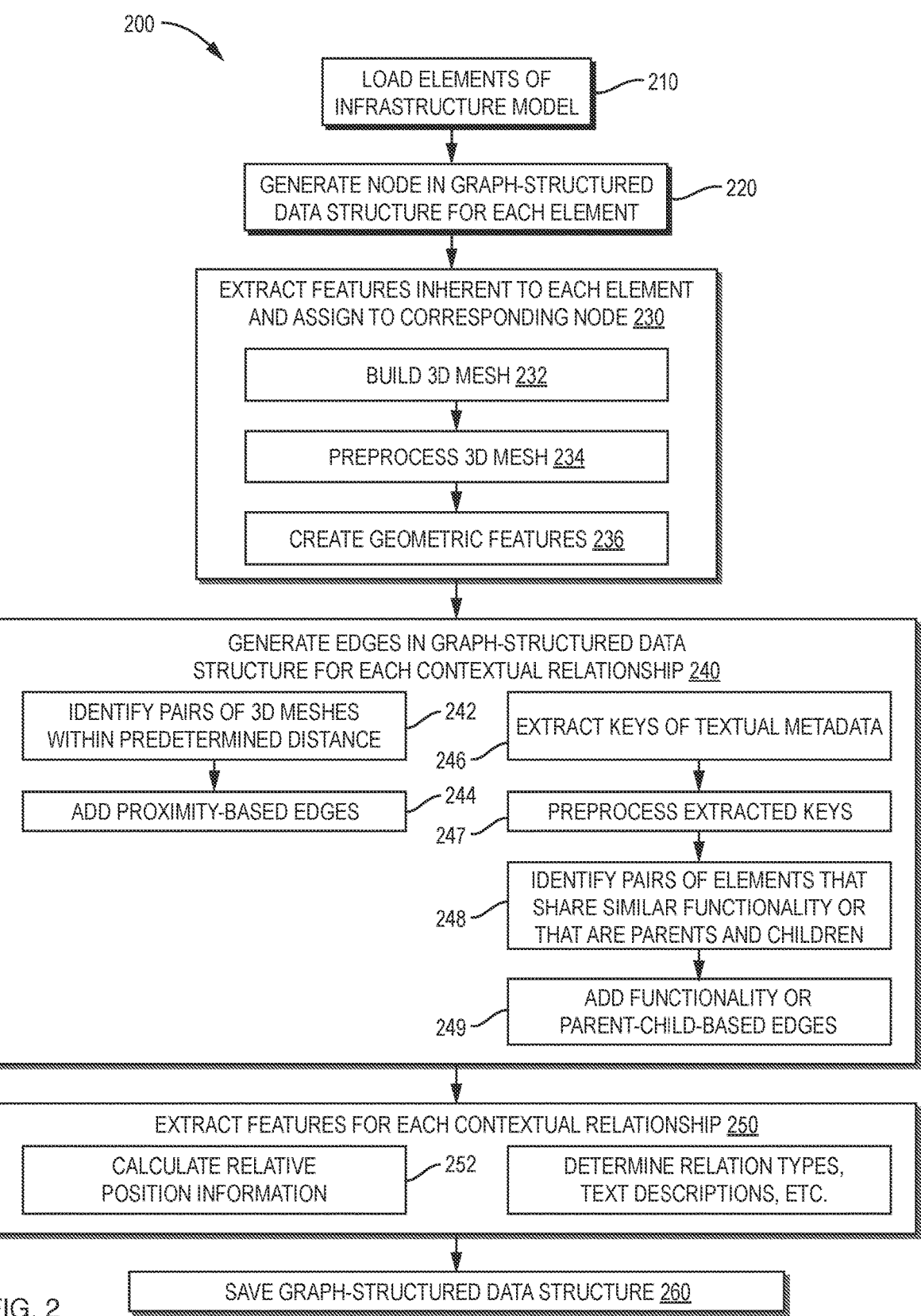
FIG. 2 is a flow diagram of an example sequence of steps that may be executed by a graph-structured data generation process to generate a graph-structured data structure from an infrastructure model.

FIG. 2 is a flow diagram of an example sequence of steps that may be executed by the graph-structured data generation process 134 to generate a graph-structured data structure 136 from an infrastructure model. The graph-structured data structure 136 may be generated as part of training the convolutional GNN 138 or as part of subsequent inference operations.

Figure 3A:
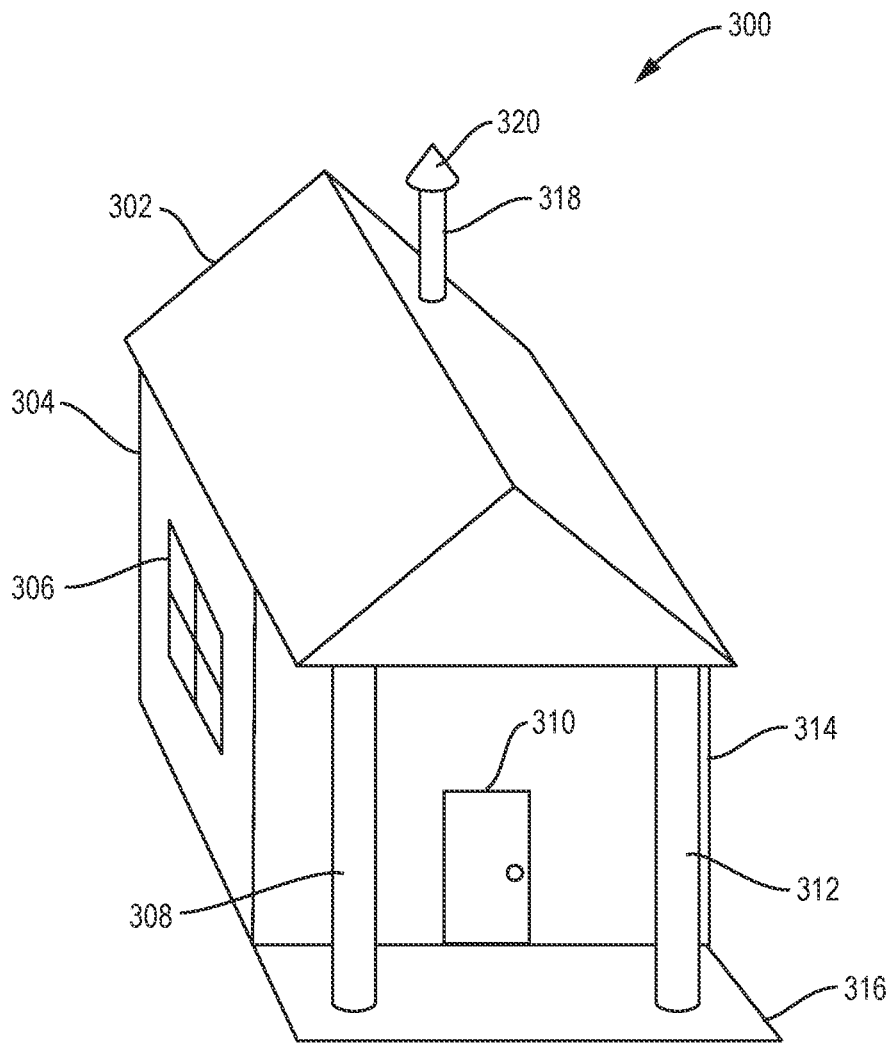
FIG. 3A is a visualization of a simple example infrastructure model including a number of geometric elements that may be loaded as part of a step of FIG. 2.

At step 210, the graph-structured data generation process 134 loads elements, for example, geometric elements (e.g., elements that include at least some geometric data, such as vertices and faces) of an infrastructure model (either a labeled dataset used for training or an inference dataset used in prediction). FIG. 3A is a visualization 300 of a simple example infrastructure model including a number of geometric elements 302-320 that may be loaded as part of step 210 of FIG. 2. The geometric elements include those that belong to a category of roof (element 302), wall (elements 304, 314), window (element 306), column (elements 308, 312), door (element 310), floor (element 316), and pipe (element 318, 320), among various other categories. It should be understood that while this simple example infrastructure model includes only a handful of elements that belong to a limited number of categories, in practical implementations infrastructure models typically include large numbers of elements that may belong to large numbers of different categories, user label, ECClass, etc.

Figure 3B:
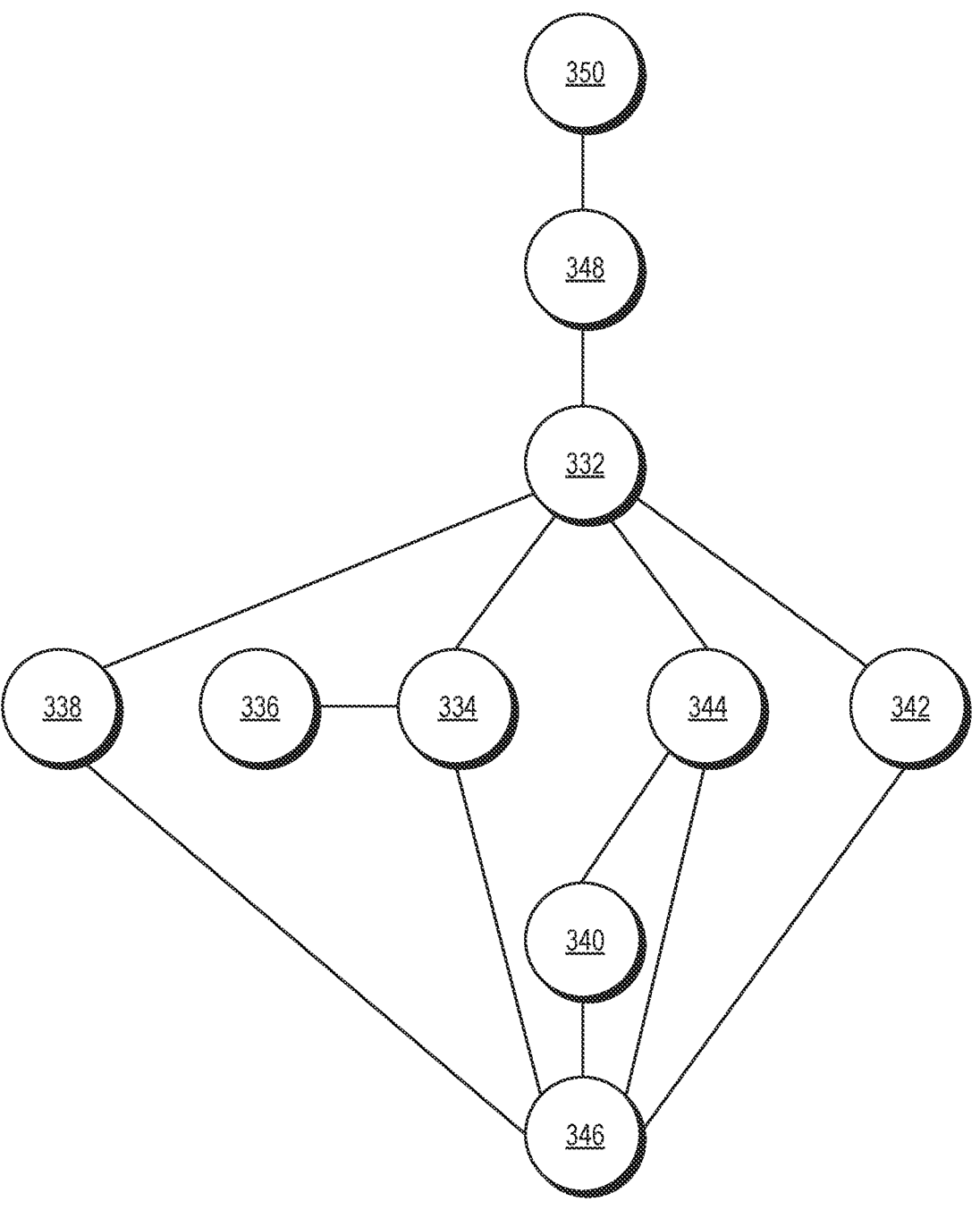
FIG. 3B is a diagram of an example graph-structured data structure that may be generated from the simple example infrastructure model of FIG. 3A.

At step 220, the graph-structured data generation process 134 generates a respective node in the graph-structured data structure 136 for each element (e.g., geometric element) of the infrastructure model. FIG. 3B is a diagram 330 of an example graph-structured data structure that may be generated from the simple example infrastructure model of FIG. 3A. In this example, nodes 332-350 have been generated for geometric elements 302-320.

At step 230, the graph-structured data generation process 134 extracts features (e.g., geometric features) inherent to each element (e.g., geometric element) and assigns them to the element's corresponding node of the graph-structured data structure 136. Such operation may involve executing a number of sub-steps. At sub-step 232, the graph-structured data generation process 134 builds a 3D mesh for each geometric element using its geometric data (e.g., vertices and faces). At sub-step 234, the graph-structured data generation process 134 preprocesses each 3D mesh. For each 3D mesh, the preprocessing may include cleaning the 3D mesh to transform it into a manifold 3D mesh, re-winding one or more faces of the 3D mesh, adding one or more additional faces to the 3D mesh, re-triangulating one or more faces of the 3D mesh, and/or other operations. At sub-step 236, the graph-structured data generation process 134 creates geometric features to be assigned to each node. Geometric features may include indications of cross section, volume, surface area, etc.

As step 240, the graph-structured data generation process 134 generates edges that connect nodes in the graph-structured data for each contextual relationship among elements. The contextual relationships may include geometric relationships, and at least some edges may be proximity-based edges that indicate that elements are proximate each other in 3D space. Generating proximity-based edges may involve executing a number of sub-steps. At sub-step 242, the graph-structured data generation process 134 identifies (e.g., using a spatial index) pairs of 3D meshes that are within a predetermined distance from each other. At sub-step 244 the graph-structured data generation process 134 adds a proximity-based edge to the graph-structured data structure 136 connecting each identified pair of nodes.

Referring again to the example in FIG. 3B, it can be seen that proximity-based edges have been added that connect nodes that are proximate to each other in 3D space of the visualization 300 of FIG. 3A. For example, node 332 (corresponding to roof element 302) is connected by proximity-based edges to nodes 334, 344 (corresponding to wall elements 304, 314), nodes 338, 342 (corresponding to column elements 308, 312) and node 346 (corresponding to pipe element 318), which are proximate to it in 3D space. Node 332 (corresponding to roof element 302) is not directly connected to the nodes of more remote elements, however, they are reachable in the graph-structured data structure via multiple hops.

In some implementations, the contextual relationships may additionally or alternatively include textual metadata-based relationships, for example, indicating similar functionality or parent-child relations, and at least some edges may be functionality-based edges that indicate elements share similar functionality or parent-child-based edges that indicate one element is the parent of the other. Such operation may involve executing a number of sub-steps. At sub-step 246, the graph-structured data generation process 134 extracts relevant keys of textual metadata. At sub-step 247, the graph-structured data generation process 134 preprocesses the extracted keys of textual metadata. For each key of textual metadata, the preprocessing may include concatenating words in the textual metadata, standardizing word representations (e.g., removing numbers and special characters, splitting words with medial capitals, converting text to a common case, replacing known abbreviations, etc.), reducing dimensionality (e.g., by deleting certain words, keeping only words identified as important, etc.), and/or other operations. At sub-step 248, the graph-structured data generation process 134 uses the preprocessed textual metadata to identify pairs of elements that share similar functionality or that are parents and children of each other, and, at step 249, adds functionality or parent-child-based edges to the graph-structured data structure 136 connecting each identified pair of nodes. Functional similarity may be determined based on common properties, common existing categories, and/or other textual metadata. Parent-child relationships may be determined based on hierarchy indicated by existing categories, and/or other textual metadata.

At step 250, the graph-structured data generation process 134 extracts features for each contextual relationship and assigns the features to the corresponding edges. Such operation may involve executing a number of sub-steps. For proximity-based edges, at sub-step 252, the graph-structured data generation process 134 calculates relative positioning information (e.g., angles between minor/major axes, centroid offsets, overlap ratios, etc.) between respective 3D meshes of elements, and assigns such information to the edge connecting the nodes representing those elements. For functionality or parent-child-based edges, at sub-step 254, the graph-structured data generation process 134 determines relation types, text descriptions, and/or other information of elements and assigns such information to the edge connecting the nodes representing those elements.

Finally, at step 260, the graph-structured data generation process 134 saves the completed graph-structured data structure 136.

Figure 4:
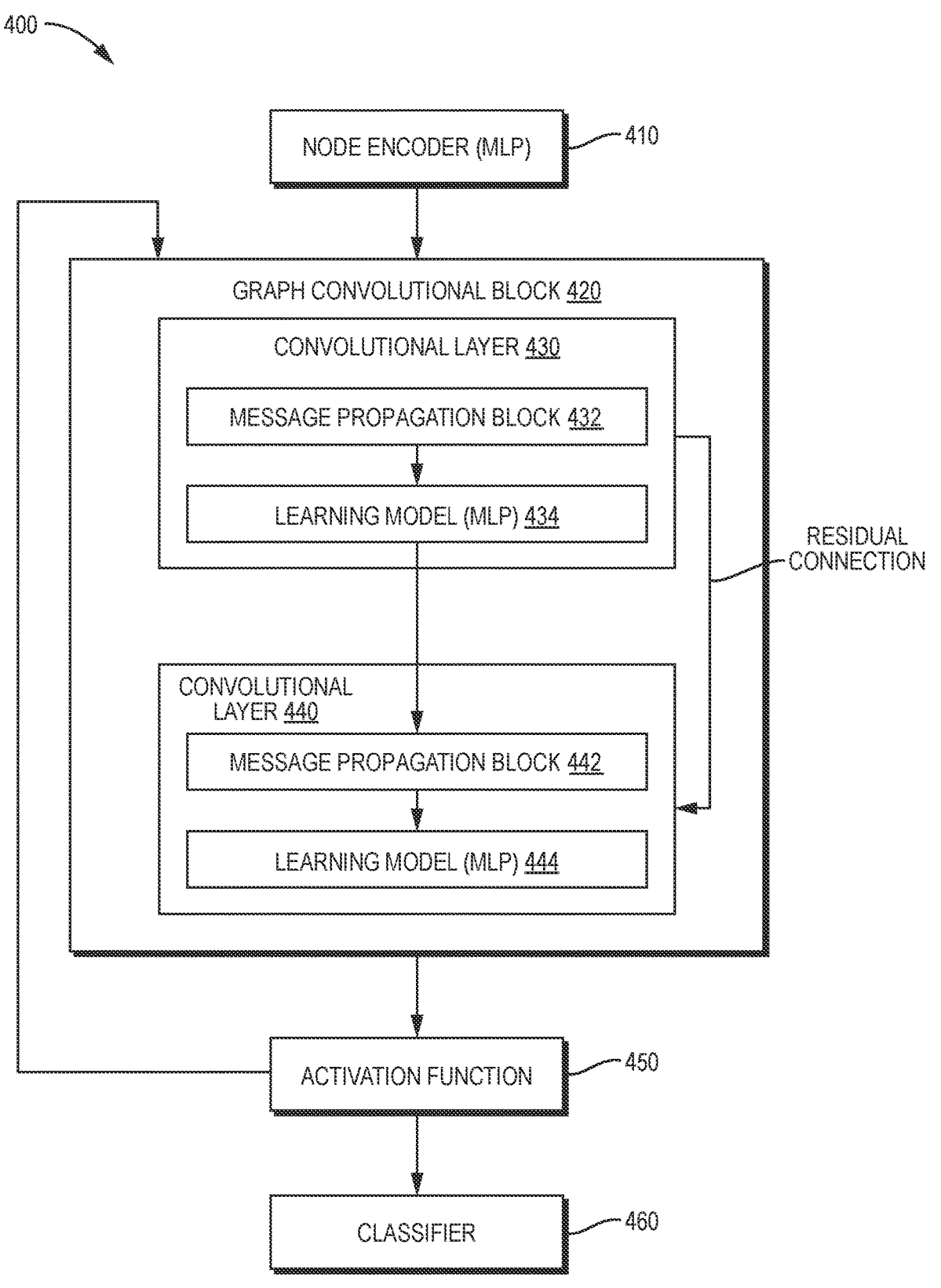
FIG. 4 is a block diagram of an architecture of an example convolutional GNN that learns embeddings from the nodes and edges of a graph-structured data structure.

FIG. 4 is a block diagram of an architecture 400 of an example convolutional GNN 138 that learns embeddings from the nodes and edges of a graph-structured data structure 136. In the implementation shown in FIG. 4, the convolutional GNN 138 is structured as multiple blocks, each containing multiple layers of multilayer perceptrons (MLPs) and neighborhood diffusions to perform supervised node classification. It should be understood, however, that in alternative implementations the convolutional GNN 138 may be structured to use other architectures, for example, an auto-encoder architecture for unsupervised production of node features, aiming to reconstruct them as accurately as possible.

Figure 3C:
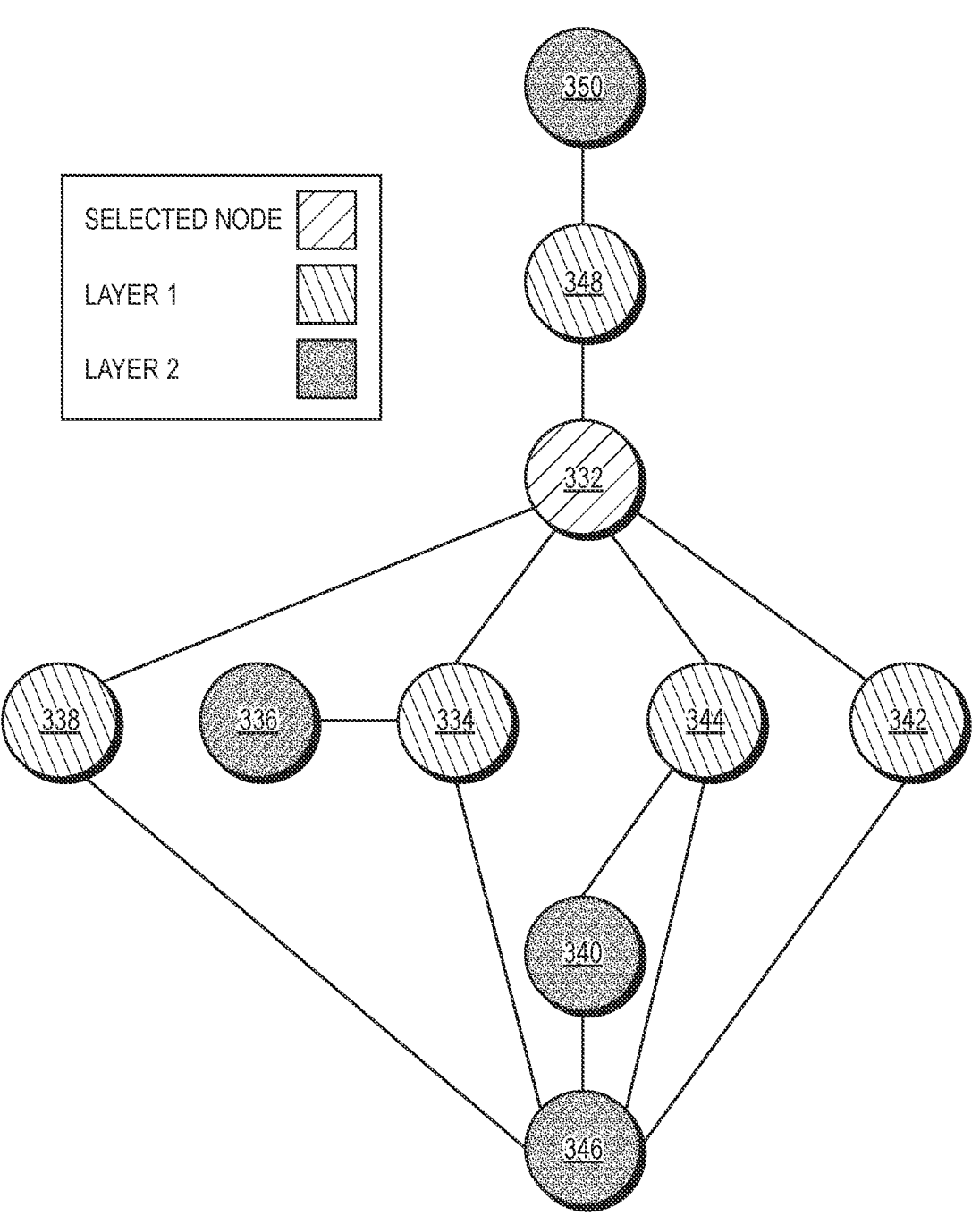
FIG. 3C is a diagram showing example nodes processed by layers based on their hops from a target node in the example graph-structured data structure of FIG. 3B.

A node encoder 410, for example, structured as a MLP, receives the graph-structured data structure 136 and defines an initial representation for each node of the graph data. The goal of the node encoder 410 is to embed features of nodes and edges into d-dimensional vectors of hidden features via a projection. The d-dimensional vectors are provided to a graph convolutional block 420. The goal of the graph convolutional block 420 is to update the d-dimensional vectors via recursive neighborhood diffusion such that nodes features are updated based on the features of their neighboring nodes and the features of edges connecting to such nodes (referred to as "related edges"). The graph convolutional block 420 may be divided into L stacked convolutional layers 430, 440. Stacking L convolutional layers 430, 440 allows the graph convolutional block 420 to build node embeddings from the L-hop neighborhood of each node. Neighboring nodes and edges that are fewer hops away may be given more weight than those further away in the L-hop neighborhood. FIG. 3C is a diagram 360 showing example nodes processed by layers based on their hops from a target node (here, node 332 corresponding to roof element 302) in the example graph-structured data structure of FIG. 3B. Nodes 324, 338, 342, 344 and 348 represent 1-hop nodes from node 332 processed at a first layer, nodes 336, 340, 346 and 350 represent 2-hop nodes processed at a second layer.

Recursive neighborhood diffusion may be performed using message passing, where neighboring nodes and related edges exchange information and influence each other's embeddings. To this end, each convolutional layer 430, 440 may include a message propagation block 432, 442 and a learning model 434, 444. Each message propagation block 432, 442 constructs and passes a message for each neighboring node of that node. Each message propagation block 432, 442 aggregates received messages for each node with an aggregate function, such as a weighted sum. Weights can be determined in various ways, for example, based upon the degree of the node (i.e. number of neighbors of the node), a Softmax function, an attention mechanism that focuses weight on the most relevant neighbors (e.g., based on a learned or geometric criteria, such as volume) and/or another mechanism.

A residual connection may be provided between the message propagation blocks 432, 442 to allow information to skip forward to improve convergence. Information may be added to that from the previous layer and passed to the learning models 434, 444. The learning models 434, 444 may be structured as a MLP and output an embedded representation of each node's inherent geometric features and contextual relationships (e.g., based on proximity, functionality, parent-child relationships, etc.)

Output of the convolutional layers 430, 440 is provided to an activation function 450. In one implementation, the activation function is a non-linear activation function, such as a rectified linear activation unit (ReLU), sigmoid, or hyperbolic tangent activation function. A classifier 460 receives the activation of each node from the activation function 450 and produces one or more per-node class predictions (e.g., one or more category, user label, ECClass, etc. predictions for the element represented by the node) and a confidence (e.g., a probability) in each class prediction. The classifier 460 may be structured as a fully connected layer with a Softmax classifier.

Figure 5:
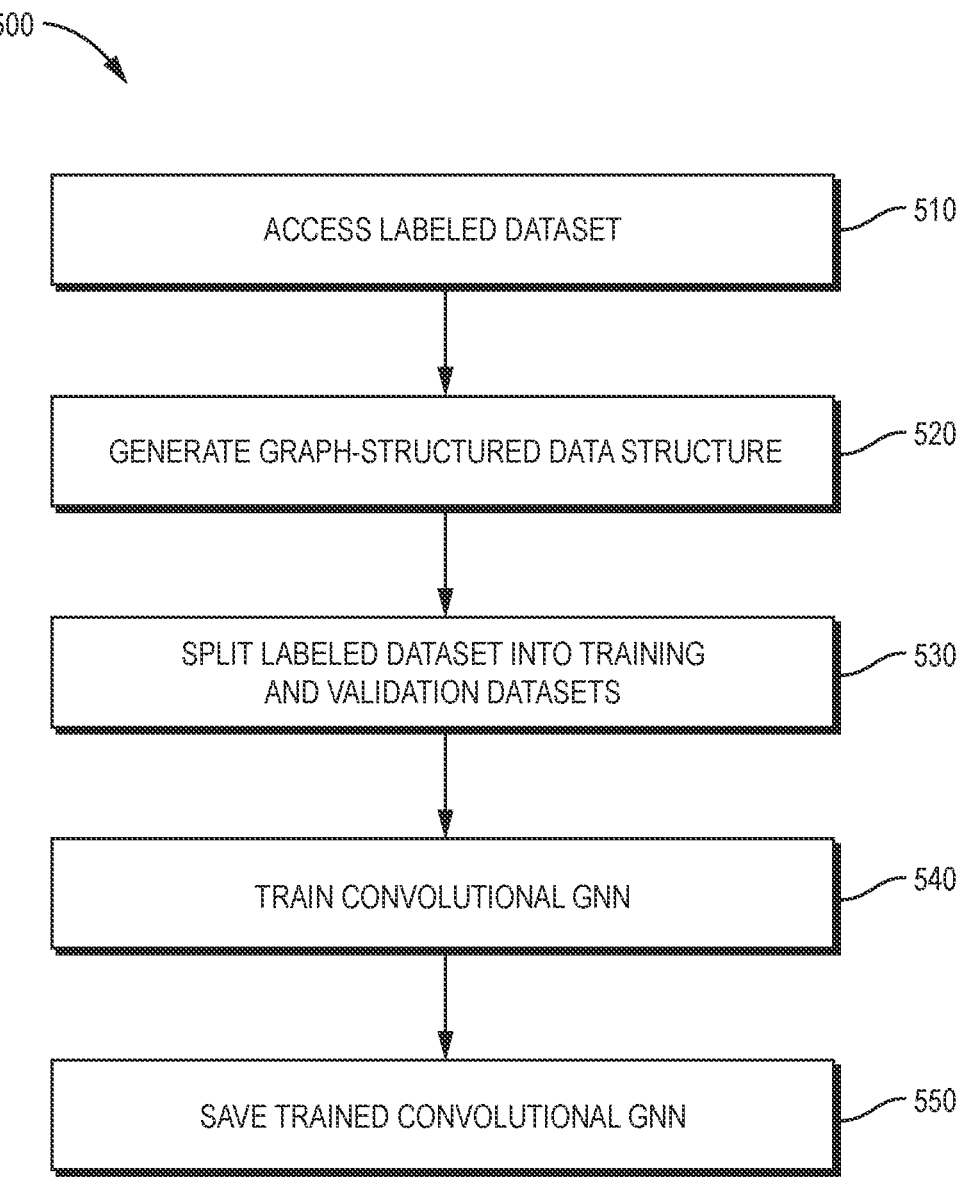
FIG. 5 is a flow diagram of an example sequence of steps that may be implemented by a design validation service to train a convolutional GNN.

FIG. 5 is a flow diagram of an example sequence of steps 500 that may be implemented by the design validation service 132 to train a convolutional GNN 138.

At step 510, a labeled dataset is accessed that includes a plurality of infrastructure models.

At step 520, the graph-structured data generation process 134 is utilized to generate a graph-structured data structure 136 from each infrastructure model, using the steps 200 of FIG. 2.

At step 530, the labeled dataset is split into a training data set and a validation dataset. The split may be performed by reserving graph-structured data structures 136 of one or more entire infrastructure models for validation.

At step 540, the convolutional GNN 138 is trained by applying the training data set to the convolutional GNN 138 with the class labels as targets, and then validating the training using the validation dataset. Loss may be calculated by comparing the label of each element with the GNN's class predictions and probabilities. An overall accuracy can also be determined, which gives an indication of the quality of the learning. Training may continue until loss and/or overall accuracy reaches a predetermined threshold or maximum.

In some implementations, such training may utilize cross-fold validation. To accurately validate performance, training and validation datasets should have similar distributions. However, splitting a labeled dataset in a manner that achieves this may be challenging. To stabilize performance evaluation during training, and to prevent overfitting on certain sets of infrastructure models, k-fold cross-folds validation may be utilized to shuffle the labeled dataset into k-groups, or folds, of approximately equal size, repeatedly reserve a fold as the validation dataset, and train the convolutional GNN 138 on the remaining k−1 folds.

At step 550, the now trained convolutional GNN 138 is saved.

Figure 6:
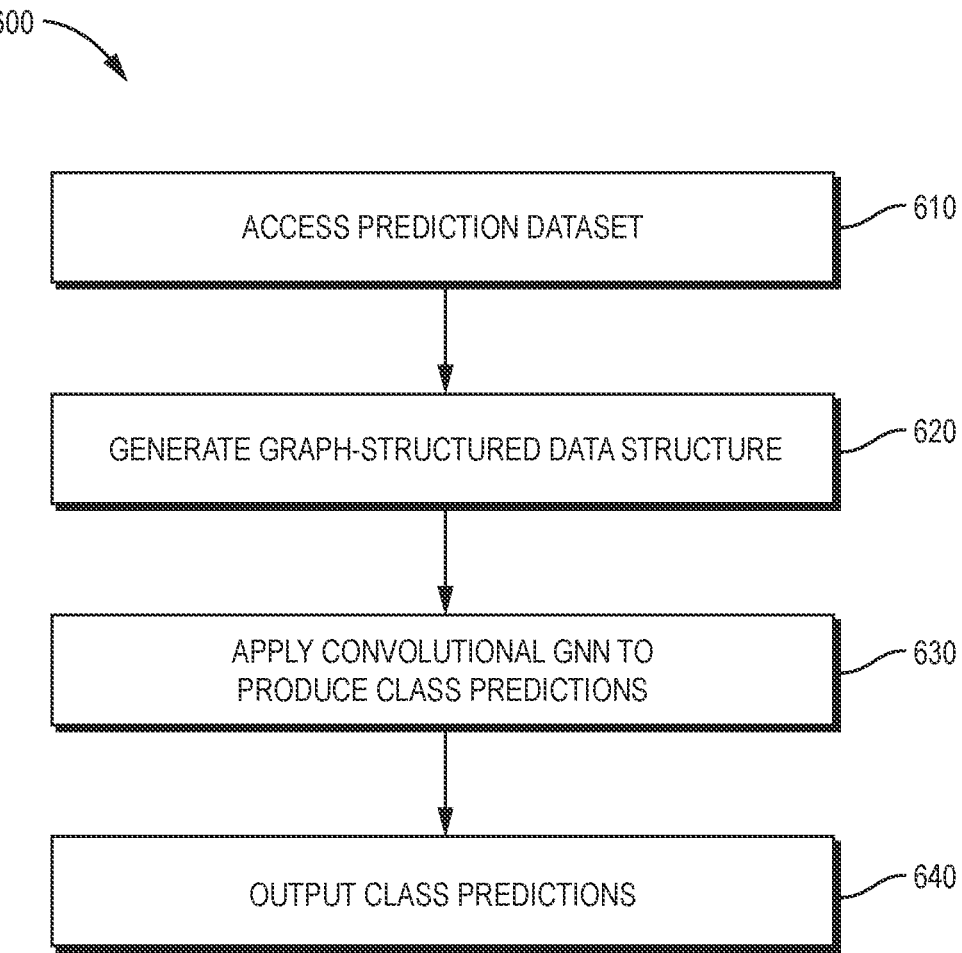
FIG. 6 is a flow diagram of an example sequence of steps that may be implemented by the design validation service to classify elements of an infrastructure model.

FIG. 6 is a flow diagram of an example sequence of steps 600 that may be implemented by the design validation service 132 to classify elements of an infrastructure model.

At step 610, an inference dataset is accessed that includes the infrastructure models.

At step 620, the graph-structured data generation process 134 is utilized to generate a graph-structured data structure 136 from the inference dataset, using the steps 200 of FIG. 2.

At step 630, the convolutional GNN 138 is applied to the graph-structured data structure 136 to produce one or more class predictions (e.g., a category, user label, ECClass, etc. for each element) and confidences therein.

At step 640, the design validation service 132 outputs indications of at least some of the class predictions. Such output may involve displaying class predictions in the design validation service's user interface, storing the class predictions in the infrastructure model to add or update class information therein, storing the class predictions in a separate data file in a repository 140, or other means of output. In some implementations, only the class prediction for an element having a greatest confidence, or only class predictions having confidences that exceed a predetermined threshold may be output. Likewise, in some implementations all class predictions and their confidences may be output.

In summary, techniques are provided to automatically classifying elements of an infrastructure model using a graph-structured data structure 136 in which nodes represent elements and edges represent contextual relationships among elements (e.g., based on proximity, functionality, parent-child relationships, etc.), and a convolutional GNN 138 that learns embeddings from the nodes and edges of the graph-structured data structure 136. It should be understood that a wide variety of adaptations and modifications may be made to the techniques.

For example, in addition to element classification (a node-level task), the convolutional GNN 138 may be used alternatively or additionally to perform edge-level and/or graph-level tasks. For example, at the edge-level the convolutional GNN 138 may be trained to output predictions for each neighboring edge to predict if two elements share the same geometry or a same category, user label, ECClass, etc. Similarly, at the graph level the convolutional GNN 138 may be trained to predict a single class for an entire infrastructure model, for example, classifying the type of infrastructure model (e.g., building, road, railway, oil platform, etc.) or predicting cost or duration of construction of the infrastructure represented in the infrastructure model. It should be understood that the convolutional GNN 138 may also be adapted for use in a wide variety of other tasks.

In general, it should be remembered that functionality may be implemented using different software, hardware and various combinations thereof. Software implementations may include electronic device-executable instructions (e.g., computer-executable instructions) stored in a non-transitory electronic device-readable medium (e.g., a non-transitory computer-readable medium), such as a volatile memory, a persistent storage device, or other tangible medium. Hardware implementations may include logic circuits, application specific integrated circuits, and/or other types of hardware components. Further, combined software/hardware implementations may include both electronic device-executable instructions stored in a non-transitory electronic device-readable medium, as well as one or more hardware components. Above all, it should be understood that the above description is meant to be taken only by way of example.

What is claimed is:

1. A method for classifying elements in an infrastructure model using a convolutional graph neural network (GNN), comprising:

accessing, by software executing on one or more computing devices, an inference dataset that includes an infrastructure model, wherein the infrastructure model includes at least some elements that are missing class information or are misclassified;

generating, by the software, a graph-structured data structure from the inference dataset that includes nodes that represent elements of the infrastructure model and edges that represent contextual relationships among the elements, wherein the contextual relationships comprise at least geometric relationships or textual metadata-based relationships;

applying, by the software, the graph-structured data structure to the convolutional GNN to produce one or more class predictions for each element, wherein the convolutional GNN produces the class predictions using embeddings that have been learned using recursive neighborhood diffusion; and outputting indications of at least some of the produced class predictions, wherein the outputting comprises correcting misclassifications or filling in missing classes in the infrastructure model and storing the infrastructure model with the corrections to misclassifications or filled in missing classes.

2. The method of claim 1, wherein the generating the graph-structured data structure further comprises:

generating a respective node of the graph-structured data structure for each element of the infrastructure model;

extracting features inherent to each element and assigning these features to the element's corresponding node of the graph-structured data structure;

generating edges that connect nodes in the graph-structured data structure for each contextual relationship among elements; and extracting features for each contextual relationship and assigning the features to a corresponding edge of the graph-structured data structure.

3. The method of claim 1, wherein the elements comprise geometric elements and the contextual relationships comprise geometric relationships.

4. The method of claim 3, wherein the geometric relationships comprise proximity in three-dimensional (3D) space of the infrastructure model, and the edges comprise proximity-based edges that indicate that elements are within a predetermine distance of each other in the 3D space.

5. The method of claim 1, wherein the contextual relationships comprise textual metadata-based relationships.

6. The method of claim 5, wherein the textual metadata-based relationships comprise functional similarity, and at least some edges are functionality-based edges that indicate elements share similar functionality.

7. The method of claim 5, wherein the textual metadata-based relationships comprise parent-child relationships, and at least some edges are parent-child-based edges that indicate one element is the parent of another.

8. The method of claim 1, wherein the convolutional GNN is structured as multiple blocks, each containing multiple layers of multilayer perceptrons (MLPs) and neighborhood diffusion is used to perform supervised node classification.

9. The method of claim 1, wherein the recursive neighborhood diffusion comprises constructing a message for each node with information that influences embeddings, passing the message to neighboring nodes, and aggregating messages received at each node with an aggregate function.

10. The method of claim 1, wherein the convolutional GNN produces the class predictions using embeddings that have been learned using cross-fold validation.

11. The method of claim 1, wherein the applying further comprises:

producing one or more edge-level predictions that predict that two elements share a same characteristic, wherein the same characteristic includes a same geometry, category or user label.

12. The method of claim 1, wherein the applying further comprises:

producing one or more graph-level predictions that predict a class that applies to the entire infrastructure model.

13. A non-transitory electronic-device readable media having instructions stored thereon that when executed on one or more processors of one or more electronic devices are operable to:

access an inference dataset that includes an infrastructure model, wherein the infrastructure model includes at least some elements that are missing class information or are misclassified;

generate a graph-structured data structure from the inference dataset that includes nodes that represent elements of the infrastructure model and edges that represent contextual relationships among the elements, wherein each contextual relationship is a geometric relationship or a textual metadata-based relationship;

apply the graph-structured data structure to a convolutional graph neural network (GNN) to produce one or more class predictions for each element, wherein the convolutional GNN produces the class predictions using embeddings that have been learned using recursive neighborhood diffusion; and output indications of at least some of the produced class predictions, wherein the output comprises correcting misclassifications or filling in missing classes in the infrastructure model.

14. The non-transitory electronic-device readable media of claim 13, wherein the elements comprise geometric elements and the contextual relationships comprise geometric relationships.

15. The non-transitory electronic-device readable media of claim 14, wherein the geometric relationships comprise proximity in three-dimensional (3D) space of the infrastructure model, and the edges comprise proximity-based edges that indicate that elements are within a predetermine distance of each other in the 3D space.

16. The non-transitory electronic-device readable media of claim 13, wherein the contextual relationships comprise textual metadata-based relationships.

17. A computing device comprising:

a processor; and a memory configured to store software that when executed on the processor is operable to:

access an inference dataset that includes an infrastructure model, wherein the infrastructure model is a built infrastructure model (BIM) or digital twin of infrastructure, and the infrastructure model includes at least some elements that are missing class information or are misclassified;

generate a graph-structured data structure from the inference dataset that includes nodes that represent elements of the infrastructure model and edges that represent contextual relationships among the elements, wherein the contextual relationships include geometric relationships that represent proximity among the elements in three-dimensional (3D) space of the infrastructure model and textual metadata-based relationships that represent functional similarity among the elements of the infrastructure model;

based on the graph-structured data structure, generate using a convolutional graph neural network (GNN) one or more class predictions for each element of the infrastructure model, wherein the one or more class predictions for each element include one or more edge-level predictions that predict that two elements share a same characteristic or one or more graph-level predictions that predict a class that applies to the entire infrastructure model;

correct misclassifications or fill in missing classes in the infrastructure model with the one or more class predictions; and output the infrastructure model with the corrections to misclassifications or filled in missing classes, wherein the output includes a display of the infrastructure model with the corrections to misclassifications or filled in missing classes on a display screen or storage of the infrastructure model with the corrections to misclassifications or filled in missing classes.

18. The computing device of claim 17, wherein the convolutional GNN is structured as multiple blocks, each containing multiple layers of multilayer perceptrons (MLPs) and neighborhood diffusion is used to perform supervised node classification.

* * * * *